(No Model.)
W. B. JACKSON.
PROCESS OF TREATING ORES.
No. 490,659. Patented Jan. 31, 1893.
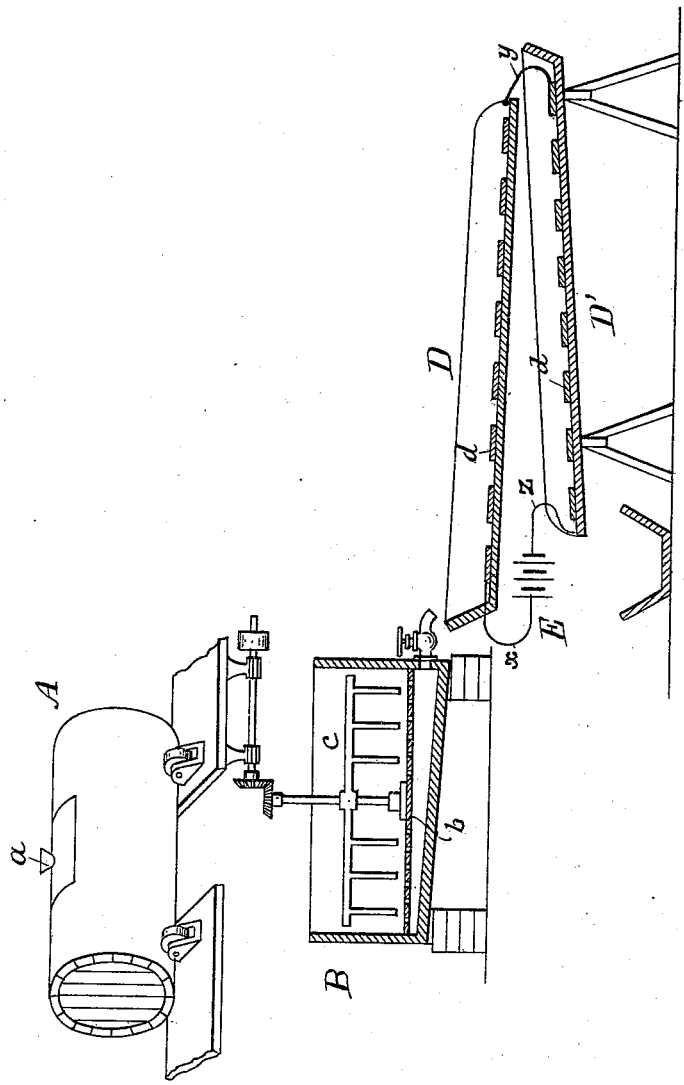
Witnesses
Chas Hanimann
H. Marler
Inventor
William B. Jackson
By his Attorney
Gw. H. Graham

UNITED STATES PATENT OFFICE.

WILLIAM B. JACKSON, OF PUEBLO, COLORADO.

PROCESS OF TREATING ORES.

SPECIFICATION forming part of Letters Patent No. 490,659, dated January 31, 1893.

Application filed October 14, 1891. Serial No. 408,695. (No specimens.)

*To all whom it may concern:*

Be it known that I, WILLIAM B. JACKSON, of the city and county of Pueblo and State of Colorado, have invented certain new and useful Improvements in Processes of Treating Ores, fully set forth in the following description and represented in the accompanying drawing.

This invention relates to an improved method of treating ore and of recovering its metals.

The improvement is particularly adapted to the treatment of ores carrying sulphur, although it can obviously be used in the treatment of other classes of ore; and its object is to provide a cheap and simple process that can be practiced with inexpensive apparatus and materials.

The improvement embraces both the complete method from the first treatment of the ore to the recovery of its metals as well as the different sub-processes or steps, as will be hereinafter fully pointed out; and in an apparatus adapted to the practical carrying out of one of the steps of the method.

Before entering into a detailed description of the process, it may be stated that it consists generally in pulverizing the ore to the proper fineness, say for instance, fifty mesh fine, which is then roasted in a suitable furnace under a low heat until it is "sweet;" or in other words, until the sulphur and other impurities carried by the ores have been volatilized and carried off. The roasted ore, preferably when cooled, is partially saturated with hot water so as to form it into a pasty mass or thick pulp, into which are separately fed chlorine gas-producing mixtures or liquids, so that the gas will be evolved or generated in its nascent form while in direct or intimate contact with the pulp, the latter being constantly agitated to insure all parts of the pulp being acted upon by the chlorine gas. This chlorinating process converts the metals in the pulp into chlorides as for instance into chloride of gold and chloride of silver. The chlorinated pulp is then preliminarily leached by being thoroughly washed with cold water so as to dissolve and carry off all the soluble base metals and the acid, the water being caught and treated, as for instance run in contact with scrap iron, to precipitate metallic copper and possibly gold and silver, should any be carried off. This washing process is continued, allowing the water to filter through the pulp until it shows no indications of carrying metals in solution. The washed pulp is then further leached or treated with a solvent for the chlorides of the metals it contains, the solvent being added to a quantity of water, and while the pulp is then being agitated the liquid solvent or solution is turned into the pulp. After the agitation has been kept up for a suitable length of time, the solution is filtered off for treatment; the solution being added to the pulp and filtered off until the chlorides have been dissolved and carried off thereby. The solution, that is to say: the water and the solvent for the chlorides, having dissolved the chlorides and absorbed the precious metals, is now treated to cause the metals to be precipitated in pure metallic form in condition to be removed for melting into bars for use. This process consists in subjecting the solution to chemical action by allowing the solution to flow over or pass in contact with metallic plates, which cause the metals in the solution to be precipitated; or to electrolytic action, by causing an electric current to pass through the solution; or, by a combination of both of said actions.

With this general understanding of the improved process, a detailed description thereof will now be given, reference for convenience being had from time to time to the accompanying drawing which illustrates a diagrammatic view of an apparatus adapted to the practical carrying out of the process.

The ore to be treated is pulverized in the usual manner to the proper fineness, say, to at least fifty mesh fine. If the ore be not a sulphuret, it is preferable to thoroughly mix with such pulverized ore a pulverized sulphuret so that the mixed ore will contain say at least two and one half per cent. of the sulphides. The object of having at least a small percentage of sulphur present in the ore to be treated is that in the roasting process it has been found that the vaporization or volatilization of the sulphur tends to liberate other impurities so that they will also be volatilized and carried off with the sulphur. This ore is roasted in any of the ordinary furnaces under a low degree of heat, such, for instance, as a rotary furnace, this being better adapted to a more perfect operation, until the ore is "sweet," that is until the impurities have been volatilized off. The roasted ore is then discharged from the furnace and allowed to cool, or until sufficiently cooled to be fed into the succeeding apparatus without danger of burning it. The roasted ore is then placed in a chlorinating tank A of the drawing, which preferably consists of a horizontal cylindrical tank made of white oak wood soaked with oil, or of other material unaffected by chlorine or the compound or liquids from which it is formed. This tank is mounted on rolls and is revolved at the proper time and for the desired period of time by suitable power to keep the ore thoroughly agitated for a purpose which will appear hereinafter. The roasted ore is fed through a manhole in the tank and is mixed with preferably hot water until it is formed into a pasty mass or thick pulp. Any excess of water is to be guarded against, as it will tend to prevent the nascent chlorine gas hereinafter referred to from meeting the ore particles intimately; in fact only sufficient water should be used to dampen the ore enough to prevent it from forming globules of the chlorine gas-forming compounds or liquids and coating them to the exclusion of the remainder of the ore.

Immediately before the pulp is agitated by revolving the tank, the ingredients or liquids, which when combined will generate chlorine gas, are separately fed onto the surface of the thick pulp in the tank. Thus, if two and one half tons of roasted ore are being treated at one time, there are used say thirty pounds of pulverized manganese (peroxide), a like weight of chloride of sodium and fifty pounds of sulphuric acid. The manganese and chloride of sodium are first fed into the tank and after the manhole has been closed and sealed, the acid is added through a suitable valve $a$, of lead or gutta-percha, whereupon the tank is set in motion and continuously revolved for say two hours. Immediately the acid is added the chlorine gas commences to form in the tank in direct contact with the pulp, and the latter being kept constantly moving, say for two hours so that all its particles are sure to meet the gas while it is in its nascent state, and come in contact intimately with the pulp and thus act most effectually upon the gold and silver in the pulp converting them into chlorides of those metals. The chlorinated pulp is then emptied from the tank into a large leaching tank B, with a perforated false bottom $b$, and an agitator $c$, and is ready for the leaching process.

The pulp is first preferably leached to dissolve out all the soluble base metals and to carry off the acids it may contain, thereby leaving the chlorinated pulp in good condition to be quickly acted upon by the dissolving solution; and to this end it is thoroughly washed while in the tank B with cold water and the water afterward allowed to filter off through the false bottom into auxiliary precipitating tanks, the washing continuing until the filtering water shows no indication of carrying metals. The auxiliary precipitating tanks contain scrap iron and cause the base metals, such as copper, to be precipitated as is well known. The pulp is then treated or leached with a dissolving solvent or solution for the chlorides of the metals it contains. For this purpose a solution is turned onto the chlorinated pulp in the leaching tank, the pulp being constantly agitated by the agitator $c$, so that all parts of the pulp will be impregnated with the solution which takes up and dissolves the chlorides of gold and silver and at the proper time is allowed to carry them off through the false bottom for treatment in the process of precipitation to be hereinafter described; the pulp being agitated continuously for a period of say five hours. The solution employed consists preferably of one and one half pounds of hyposulphite of sodium and about one fourth of a pound of chloride of sodium per gallon of water, sufficient solution being used to thoroughly take up or dissolve the chlorides of the metals contained by the pulp. This hyposulphite and chloride of sodium solution when brought in contact with the chlorides of the metals acts as a solvent thereof and in consequence, they become dissolved and pass into solution. This action, however, is more than a mere passage of the chlorides into solution, that is to say, a double decomposition is brought about by the action of the hyposulphite of sodium and chloride of silver upon each other by which hyposulphite of silver and chloride of sodium is formed; as: $Na_2S_2O_3 + 2Ag.Cl. = Ag_2S_2O_3 + 2Na.Cl.$ No sooner is hyposulphite of silver formed than a further change takes place, that is, the formation of a double compound consisting of hyposulphite of silver and hyposulphite of sodium expressed by the formula: $2Ag.Na.S_2O_3$; or $Ag_2S_2O_3 + Na_2S_2O_3$. The reaction is the same in the case of chloride of gold. The presence of the chloride of sodium in the solution exerts a powerful effect in bringing about the above reactions, $i.\ e.$, it intensifies the action that takes place between the hyposulphite of sodium and the chloride of silver; and it also aids the solvent action of the hyposulphite of sodium upon the chlorides of both gold and silver. After the solution has been allowed to filter off from the tank, leaving the pulp dry or nearly dry, a fresh solution may be turned onto the pulp and the agitator again set in motion. At the end of say two hours, this may be filtered off; and the operation be repeated until all the chlorides of gold and silver have been dissolved and carried off. The remaining pulp may then be thoroughly washed with water, and this washing water may be caught by other tanks and used for washing other lots of pulp until the water carries enough gold and silver to warrant its treatment to precipitate these metals. The different solutions after they have been treated by the precipitation process hereinafter described may be employed over and over again, strengthening the solution for this purpose by adding the solvents heretofore set forth. This solution may thus be used continuously and loss of metals prevented.

It may be remarked in passing that the use of a small quantity of chloride of sodium being a neutral salt acts to preserve the active condition of the hypo-sulphite, increases the efficiency of the latter as a solvent and its presence in the solution also facilitates the succeeding treatment of the precipitation by augmenting the chemical and electric actions.

The final step in the process consists in precipitating the metals held or carried by the solution. To this end the solution is brought in contact with one or more zinc plates, which immediately sets up a chemical action in the solution and causes the metals dissolved therein to be precipitated in pure metallic particles. The precipitating action may be augmented by passing a weak current of electricity through the solution as by connecting the zinc plates in circuit with a battery. Instead of conducting the solution to the zinc plates, one or more of the plates may be immersed in the solution with the same result but not so effectively.

The preferred mode of practicing the process is to flow the solution over the zinc plates in a shallow stream, the plates being separated a short distance apart, causes the stream to be somewhat agitated in its flow which tends to cause all parts of the solution to be affected by the zinc plates as well as effectively keeping the surface of the plates clean and free of the precipitated metallic particles which thus may settle in the space between the plates. The result of this method of precipitation is pure metallic particles entirely free from the precipitating agent, as for instance, zinc particles, as it has been found in the practical use of this process after long and continued commercial use that though the zinc plates gradually waste away, the precipitated particles of gold and silver are absolutely free from any impurities and need after collection simply washing and drying to be ready to be melted and cast into bars for subsequent use.

A precipitating apparatus adapted to the carrying out of this process is indicated by the troughs D, D', inclined downward slightly so that the solution run into the upper end of the trough will readily flow to the discharging end. The trough in practice is made about one hundred and fifty feet long, ten inches wide, and six inches deep with an incline of about one half of an inch to the foot. The trough may be arranged in sections as shown one above the other to economize space. Along the bottom of the trough is laid a number of zinc plates $d$ about eighteen inches long, nine inches wide and one half of an inch in thickness. These zinc plates are arranged with a space of about from two to six inches between them. The solution flowing along the trough in a shallow stream flows in contact with the plurality of zinc plates and owing to the chemical action set up in the solution, the unstableness of the metallic solution causes, it is believed, the hypo-sulphite to leave the metals and pass to or dissolve the zinc plates, thus precipitating the metals such as gold and silver that have been held in solution in fine particles to the bottom of the troughs.

The precipitating action of the zinc plates upon the solution containing the gold and silver may be augmented by placing the zinc plates in circuit with an electric battery or other generator E, as shown. One pole of the generator E is connected by a conductor $x$, to the first zinc plate of the series, and the other pole of the generator by a conductor $z$, to a terminal at the lower end of the second trough. There is another short conductor $y$, leading from a terminal at the end of the first trough to the first zinc plate of the second trough, which when the solution is present forms the complete circuit. The solution is a conductor of electricity, and when such a solution is brought in contact with the plates of zinc a chemical or electrical action immediately takes place in the solution and by arranging the zinc plates a short distance apart the current of electricity from plate to plate, conducted by the solution, meets with a resistance greater than when passing through the solution immediately over the plates, whereby decomposition is greater, and in consequence the precipitation is more rapid and complete. In this treatment the following reaction occurs: First, the double compound of hyposulphite of silver and hyposulphite of sodium is decomposed, that is, $2Ag.Na.S_2O_3 = Ag_2S_2O_3 + Na_2S_2O_3$. Second, the molecule of hyposulphite of silver resulting from decomposition of the double compound of hyposulphite of silver and hyposulphite of sodium undergoes decomposition, metallic silver and hyposulphite of silver being formed as in the formula $Ag_2S_2O_3 + Zn. = Zn.S_2O_3 + 2Ag$. This action is facilitated by the presence of the chloride of sodium in the solution which was employed with the hypo-sulphite in the leaching process, and while it preserves the active condition of the hypo-sulphite, it also renders the hypo-sulphite slightly more unstable so that it will readily precipitate the metallic gold and silver. The solution after being relieved of its metals may be used over again as before explained.

The precipitating troughs are shown as one form, the most preferable one for a continuous process, by which the process may be practically carried out; it being obvious that other arrangement of apparatus may be adapted for the same purpose.

The process for treating ores thus particularly described may for convenience be said to consist in its entirety in pulverizing the ore to be treated, then roasting it sufficiently to drive off the sulphur and other impurities, then chlorinating the roasted ore by generating the chlorine in its nascent state in intimate contact with the ore and thereby form its metals into chlorides, then if desired, dissolving all the metals out from the ore that are soluble in water, then treating the ore with a solvent for the chlorides and conveying off such solvent, and finally treating said solvent either chemically or electrically, or both, so that the metals held in solution are precipitated.

It is to be understood that the improved method of precipitating hereinbefore described, does not depend upon the specific preceding steps of the process of treating the ores, as for instance the roasting step may be by any known method, and the chlorination of the ores may be effected in other ways, including forming the chlorides during the roasting step in the furnace as will be readily appreciated. So too, the method of forming the nascent chlorine gas while in intimate contact with the pulp is not dependent upon the other steps of the process. And again, the leaching of a chlorinated ore with a solution of hypo-sulphite and chloride of sodium is neither dependent upon the manner of chlorinating the ore, nor upon the subsequent treatment for obtaining the metals from that solution.

I am aware that it has been proposed to employ zinc as a precipitating agent in a cyanide of potassium solution, but this former process differs from mine in that it was necessary to scrape or dissolve the zinc to remove the precipitated metal, while in my process the precious metal is precipitated in fine powder, which can be removed without scraping or dissolving the zinc, leaving the precious metal practically fine and free of the zinc.

What is claimed is:—

1. The hereindescribed method of precipitating metals held in a hypo-sulphite solution, which consists in subjecting the solution to the action of one or more zinc plates whereby the metal is precipitated in fine clean powder free of zinc.

2. The hereindescribed method of precipitating metals, which consists first, in chlorinating the ore; second, dissolving the chlorides with a hypo-sulphite solution; and third, subjecting the solution to the action of one or more zinc plates whereby the metal is precipitated in fine clean powder free of zinc.

3. The hereindescribed method of precipitating metallic silver and gold, which consists in dissolving silver and gold compounds in a hypo-sulphite solution, and then subjecting the solution in the presence of zinc to electrolytic action.

4. The hereindescribed method of recovering metals which consists in dissolving the metals in a solution of a hypo-sulphite and chloride of sodium, and then subjecting the solution to an electrolytic precipitating action in the presence of zinc.

5. The hereindescribed apparatus for precipitating metals held in solution consisting of an inclined trough having a series of disconnected zinc plates arranged therein, an electric generator and connections leading from the generator into the ends of the trough, the connections and zinc plates being arranged to be formed in a continuous conductor by the presence of the solution.

6. The hereindescribed apparatus for precipitating metals held in solution consisting of an inclined trough having a series of disconnected zinc plates arranged therein and forming a broken conductor, an electric generator, one pole connected with one of said plates and another leading from a terminal in the trough to the other pole of the generator, whereby the solution fed to the trough over the broken conductor forms a conductor of greater resistance between said plates.

In witness whereof I have signed my name, in the presence of two witnesses, this 8th day of October, 1891.

WILLIAM B. JACKSON.

Witnesses:
N. MARLER,
GEO. H. GRAHAM.